(12) United States Patent
Elbaz et al.

(10) Patent No.: US 8,000,467 B2
(45) Date of Patent: Aug. 16, 2011

(54) DATA PARALLELIZED ENCRYPTION AND INTEGRITY CHECKING METHOD AND DEVICE

(75) Inventors: Reouven Elbaz, Princeton, NJ (US); Joan Daemen, Overpelt (BE); Guido Bertoni, Carnate (IT)

(73) Assignees: STMicroelectronics SA, Montrouge (FR); Ecole Nationale Superieure des Mines de Saint-Etienne, Saint-Etienne Cedex (FR); STMicroelectronics S.r.l., Agrate Brianza (IT); Porton World International N.V., Zaventem (BE)

( * ) Notice: Subject to any disclaimer, the term of this patent is extended or adjusted under 35 U.S.C. 154(b) by 1184 days.

(21) Appl. No.: 11/725,985

(22) Filed: Mar. 19, 2007

(65) Prior Publication Data

US 2008/0232581 A1 Sep. 25, 2008

(51) Int. Cl.
*H04K 1/00* (2006.01)
(52) U.S. Cl. ............................................. 380/28; 380/37
(58) Field of Classification Search .................... 380/28, 380/29, 30, 59, 37, 38, 43, 204
See application file for complete search history.

(56) References Cited

U.S. PATENT DOCUMENTS

| | | | | |
|---|---|---|---|---|
| 4,316,055 A | * | 2/1982 | Feistel | 380/37 |
| 5,818,934 A | * | 10/1998 | Cuccia | 380/216 |
| 6,072,873 A | * | 6/2000 | Bewick | 380/217 |
| 7,602,906 B2 | * | 10/2009 | Ferguson | 380/29 |
| 2001/0033656 A1 | * | 10/2001 | Gligor et al. | 380/28 |
| 2002/0044651 A1 | * | 4/2002 | Tuvell | 380/37 |
| 2002/0112152 A1 | * | 8/2002 | VanHeyningen et al. | 713/151 |
| 2003/0167314 A1 | * | 9/2003 | Gilbert et al. | 709/217 |
| 2004/0019789 A1 | * | 1/2004 | Buer | 713/170 |
| 2004/0039908 A1 | * | 2/2004 | Rose et al. | 713/168 |
| 2004/0179690 A1 | * | 9/2004 | Soliman | 380/277 |
| 2005/0111658 A1 | * | 5/2005 | Ida et al. | 380/28 |
| 2005/0201342 A1 | * | 9/2005 | Wilkinson et al. | 370/338 |
| 2006/0015753 A1 | * | 1/2006 | Drehmel et al. | 713/193 |
| 2006/0053441 A1 | * | 3/2006 | Walker | 725/30 |
| 2006/0126841 A1 | * | 6/2006 | Pal et al. | 380/255 |
| 2006/0126843 A1 | * | 6/2006 | Brickell et al. | 380/260 |
| 2007/0116273 A1 | * | 5/2007 | Kurdziel | 380/37 |
| 2008/0232581 A1 | * | 9/2008 | Elbaz et al. | 380/42 |

OTHER PUBLICATIONS

Mihir Bellare and Chanathip, Authenticated encryption, 2000, pp. 531-545.*
Reouven Elbaz, A parallelized way to provide data encryption and integrity checking on a processor -memory bus, ACM, Jul. 2006, pp. 506-509.*

(Continued)

*Primary Examiner* — Eleni A Shiferaw
*Assistant Examiner* — Abu Sholeman
(74) *Attorney, Agent, or Firm* — Lisa K. Jorgenson; Timothy L. Boller; Seed IP Law Group PLLC

(57) ABSTRACT

A method and device for encrypting and/or decrypting binary data blocks protecting both confidentiality and integrity of data sent to or received from a memory. The encryption method comprises steps of: applying to the input data block a reversible scrambling process, the scrambling process providing a scrambled data block in which the bits of the input data block are mixed so that a modification of one bit in the scrambled data block impacts on every bit of the input data block, and applying to the scrambled data block a stream cipher encryption algorithm providing an encrypted data block. Application can be made to secured integrated circuits requiring to securely store data in an external memory.

46 Claims, 3 Drawing Sheets

OTHER PUBLICATIONS

Mihir Bellare and Chanathip Namprempre, Authenticated Encryption: Relations among Notions and analysis of the Generic Composition Paradigm, 2000, Springer-Verlag Berlin Heidelberg, pp. 531-545.*

Reouven et al, A parallelized way to provide data encryption and integrrity checking on a processor-memory Bus, 2006, ACM 1-59593-381, p. 506-509.*

"Advanced Encryption Standard (AES)," National Institute of Standards and Technology (NIST), Nov. 26, 2001, pp. 1-47.

Bellare, M. et al., "Authenticated Encryption: Relations among Notions and Analysis of the Generic Composition Paradigm," *Asiacrypt* 2000, Sep. 2000, pp. 531-545.

Daemen, J. et al., "AES Proposal: Rijndael," http://csrc.nist.gov/CryptoToolkit/aes/rijndael/Rijndael-ammended.pdf, Mar. 9, 1999, pp. 1-45.

Elbaz, R. et al., "A Parallelized Way to Provide Data Encryption and Integrity Checking on a Processor-Memory Bus," *DAC* 2006, Jul. 24-28, 2006, pp. 506-509.

Kaukonen, K. et al. A Stream Cipher Encryption Algorithm "Arcfour," <draft-kaukonen-cipher-arcfour-01.txt>, Jul. 1997, 13 pages.

Daemen, J. and Rijmen, V., "The Design of Rijndael," Springer-Verlag Berlin Heidelberg: Germany, 2002.

* cited by examiner

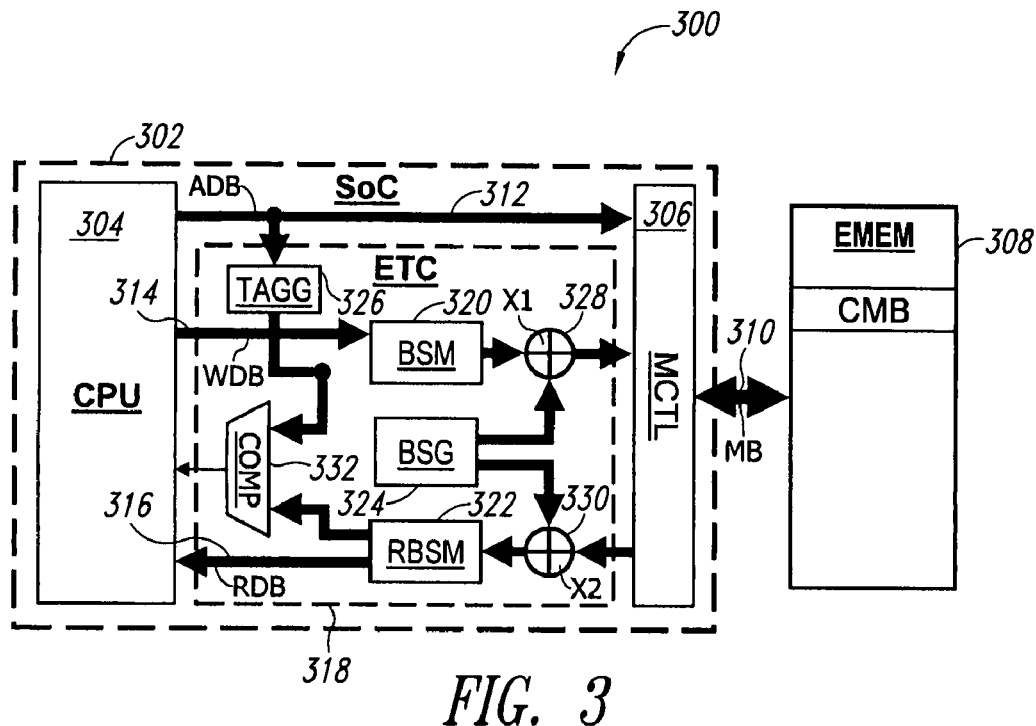
FIG. 3
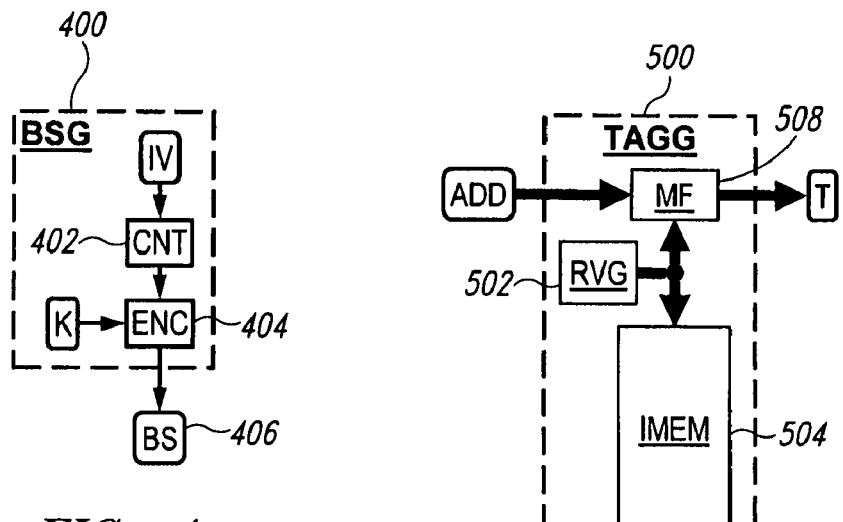
FIG. 4
FIG. 5

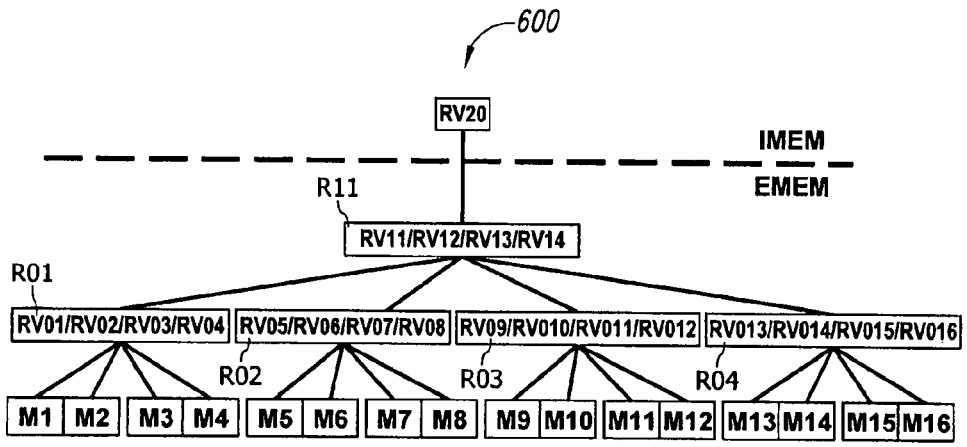
*FIG. 6*
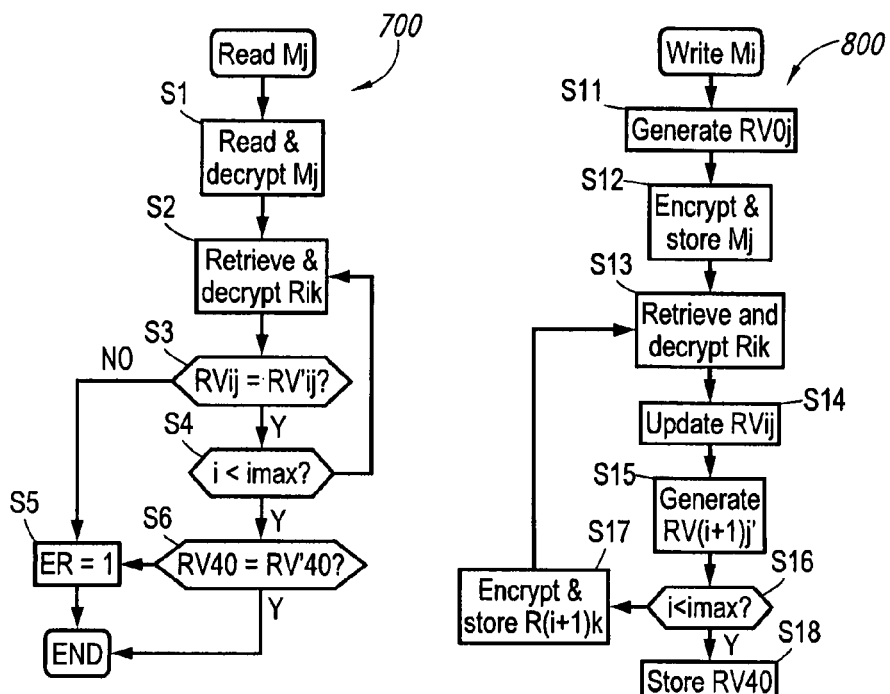
*FIG. 7*
*FIG. 8*

DATA PARALLELIZED ENCRYPTION AND INTEGRITY CHECKING METHOD AND DEVICE

BACKGROUND OF THE INVENTION

1. Field of the Invention

The present disclosure relates in general to the field of data encryption and data storage systems, and particularly to an encryption and/or decryption method and device in which confidentiality and integrity of data are protected.

It applies particularly but not exclusively to embedded systems such as PDAs (Personal Digital Assistant), mobile phones, MP3 players, set-top box, video equipments, etc., comprising a processing integrated circuit linked to at least one memory or storage device through a wired or wireless communication link.

The range of services provided by such an embedded system tends to widen rapidly and applications like on-line banking transactions, web browsing, email, and application and game downloading become common on mobile devices. As a consequence the amount of sensitive information such as private data (bank information, passwords, email, photos . . . ), or data protected by intellectual property rights (software, digital multimedia content . . . ) contained or transiting in those devices also increases. The issue is that today's embedded systems are considered as untrustworthy hosts since the owner, or anyone else who succeeds in getting access, is a potential adversary. Thus, one of the challenges for the high-technology industry in the development of pervasive computing is the ability to ensure secured computation and storage.

The attacks conducted on embedded systems challenge several security services such as data confidentiality, data integrity and system availability. Data confidentiality is designed to limit reading of data stored in or transiting through embedded systems to authorized parties, while data integrity is designed to prevent those data from being tampered with, deleted or altered by malicious entities. Availability refers to providing the user with access to the device while avoiding unexpected delay or obstacle.

The objectives of attacks directed against an embedded system include retrieving information, possibly private, or to taking control of it. One of the weakest points of such a system is the memory bus between the System on Chip (SoC) and the off-chip memory which contains sensitive data (end users private data, software code, etc.). Those data are usually exchanged in clear over the memory bus during software loading and execution. Therefore an adversary may probe the memory bus to read and retrieve private data or software code (data confidentiality concern). Another possible attack relies on code injection and on data tampering (data integrity concern).

An attacker can thus monitor the processor-memory communications and intercept the data transmitted (passive attacks). Another possibility is to directly read data in memory. This raises the issue of data confidentiality. Then the adversary may insert chosen texts—called "fake" in the following—into the processor-memory communication channels and thus challenge data integrity. The objective of the attacker could be to take control of the system by injecting malicious codes or to constrain the search space in case of a message or secret key recovery attack. Thus the following three kinds of active attacks are conceivable even if data are encrypted.

Spoofing attacks: this kind of attack consists in exchanging a memory block transmitted in the communication channel with a random fake one. The attacker mainly alters program behavior but cannot foresee the results of his attack if the data are encrypted.

Splicing or relocation attacks: this kind of attack consists in swapping a memory block transmitted in the communication channel with another one previously recorded in the external memory. Such an attack may be viewed as a spatial permutation of memory blocks. When data are encrypted, the benefit for an attacker of using a memory block copy as a fake is the knowledge of the system behavior if the latter has been previously observed.

Replay attacks: this kind of attack is nearly the same as the splicing attack one. However the fake memory block is recorded at a specific address location and inserted later on at the same address (current data value replaced by an older one). Such an attack may be viewed as a temporal permutation of memory blocks at a specific address location.

In order to perform those kinds of active attacks, the adversary may interfere in the protocol of communication between the system and the memory to handle the data, address and control lines. In this way an attacker may insert data directly into RAM memory or switch between the attacker's RAM and the device RAM at run-time.

2. Description of the Related Art

The known countermeasures consist in checking the integrity of or authenticating the data read in the external memory against spoofing attacks, and authenticating transactions against splicing and replay attacks.

Protecting confidentiality of external memory content consists in preventing any useful information leakages from the external memory. Hence, the basic goal is that data monitored by an eavesdropper on the processor-memory communication channel or retrieved in memory be unintelligible. This task is achieved by performing bus encryption. Data are encrypted on write operations and decrypted on read operations. In this way data transiting in the communication channel and stored in the external memory are encrypted, making them incomprehensible from an adversary point of view. However, targeted memories are generally of the type Random Access Memory (RAM), meaning that memory accesses could be of any length and start from any address. Hence a granularity of encryption i.e., the size of the atomic block processed by the encryption engine on external memory accesses is defined. Such a size is one of the parameters which fix the trade-off between performance and security. Data block that are too short lead to weak encryption while too long ones may decrease computation performance, e.g., by polluting the memory bandwidth on small memory accesses.

The integrity of the memory content is protected by checking that read data has not been tampered during external storage or transmission over the communication channel. Like for encryption, a granularity of integrity checking on read operations is defined. To fulfill the integrity checking objective, a value is concatenated with each data block stored in the external memory. This value called "tag" is usually computed on-chip with a MAC (Message Authentication Code) algorithm on write operations. Such an algorithm based on hash functions or on symmetric block encryption accepts as inputs the data block and a secret key. Theoretically the generated tag gives a compact representative image of the data block and its source, i.e., the processor. Moreover, only the system on-chip is capable of computing this tag, as the secret key is stored on-chip. On read operations, the integrity of the loaded data block is checked by verifying the tag.

Such a system with integrity control of the external memory is described in "Authenticated Encryption: Relations among notions and analysis of the generic composition paradigm", M. Bellare, C. Namprempre, ASIACRYPT '00, September 2000. According to this document, the MAC can be computed after (encrypt-then-MAC scheme), in parallel (encrypt-and-MAC scheme) or before (MAC-then-encrypt scheme) the data block is encrypted. A system in which the data block is encrypted before the MAC is computed (encrypt-then-MAC scheme) is represented in block form in FIG. 1. In FIG. 1, the system SoC 100 is connected to an external memory EMEM 102 through a memory bus MB 104. The system SoC 100 comprises a processing unit CPU 106, a memory controller MCTL 108, and a protection device ETC1 110 therebetween. The device ETC1 110 comprises an encryption module ENCM 112, a decryption module DECM 114, a MAC computation module MCM 116 and a tag comparator COMP1 118. The module ENCM 112 is connected to a write data bus WDB 120 between the unit CPU 106 and the controller MCTL 108. The module ENCM 112 encrypts data blocks to be transmitted from the unit CPU 106 to the memory EMEM 102 via the memory controller 108. The module DECM 114 is connected to a read data bus RDB 122 between the controller MCTL 108 and the unit CPU 106. The module DECM 114 decrypts data blocks received from the memory EMEM 102 via the memory controller 108. The module MCM 116 receives encrypted data blocks from the module ENCM 112 and from the controller MCTL 108. The module MCM 116 provides a tag T 124 to each encrypted data block CMB 126 to be written in the memory EMEM 102 and provides a reference tag to an input of the comparator COMP1 118 during read operations. The tag extracted from each data block read in the memory EMEM 102 is provided to the comparator COMP1 118. The output of the comparator is connected to an input of the unit CPU 106. The encryption algorithms used by the modules ENCM 112 and DECM 114 are for example of the symmetrical type.

During a write operation, the data block CMB 126 to be written in the memory EMEM 102 is encrypted by the module ENCM 112. A tag T 124 is computed by the module MCM 116 from the encrypted data block, using for example the address in the memory EMEM 102 of the data block CMB 126. The data block CMB 126 associated with the tag T 124 is then transmitted on the bus MB 104 to be written in the memory EMEM 102.

During a read operation, the tag associated with the loaded data block is checked. To this purpose, a tag reference is computed by the module MCM 116 on the encrypted data block read in the memory using the read address and compared by the comparator COMP1 118 with the tag associated with the data block retrieved from the memory EMEM 102. If the tag matching process fails, an integrity checking flag informs the CPU unit 106 which in turn adopts an adequate behavior (for instance execution of a HALT instruction to stop processor execution).

In an encrypt-then-MAC system as shown in FIG. 1, encryption and tag computation are necessarily performed sequentially. Thus the latencies of each computation (encryption and tag computation) are added. In addition, the hardware cryptographic circuits should be duplicated to be able to parallelize the processes of decryption and MAC computation. Thus this system presents the drawbacks of an increased latency and duplicated hardware.

BRIEF SUMMARY OF THE INVENTION

An object of an embodiment of the present invention is to protect the communication channels of a system between a processor chip and other components of the system against physical non-invasive attacks, or board-level attacks conducted on buses between the system and an external memory or directly in the external memory. The external memory can be, for example, volatile (RAM) or non volatile (EEPROM, Flash) memory.

Another object of an embodiment of the present invention is to provide a private and authenticated tamper resistant environment for application execution. This includes protecting the confidentiality and integrity of the off-chip memory content during storage or execution to prevent leakage of any sensitive information and to prevent processing of intentionally altered data.

An object of an embodiment of the present invention is to improve the protection device as described above by reducing latencies or processing times of read and write operations while maintaining protection provided by the protection device.

Another object of an embodiment of the invention is to provide encryption and decryption processes that are parallelizable.

An aspect of an embodiment of the invention is to apply a reversible block scrambling to a data block to be protected before performing a bit stream encryption. The block scrambling function chosen may have the property of mixing the bits of an input data block so as to ensure that any modification in the encrypted data block by someone not knowing the encryption key has a very high probability of being detected. In other words, the chosen scrambling function may be such that any modification of in the encrypted data block shall lead to a difference in a part of the input data block with a probability greater than $1-2^{(-t)}$, where t is the length of the considered part which is smaller than half of the data block.

An embodiment of the present invention provides a method for encrypting binary data blocks comprising steps of:

applying to an input data block a reversible scrambling process, the scrambling process providing a scrambled data block, and applying to the scrambled data block a stream cipher encryption algorithm providing an encrypted data block, the scrambling process mixing the bits of the input data block so that any modification of the encrypted data block has a probability of being detected after decryption.

According to one embodiment, the method further comprises steps of:

generating a tag for the input data block to be encrypted, and concatenating the tag with the input data block, the scrambling process being applied to the block resulting from concatenation, so that a modification of one bit in the encrypted data block impacts on the tag with a high enough probability.

According to one embodiment, the scrambling process applies to the input data block at least three iterations of a Rijndael algorithm.

According to one embodiment, the stream cipher encryption algorithm combines each bit of the scrambled data block with a respective bit of a bit stream.

According to one embodiment, each bit of the scrambled data block is combined with a respective bit of the bit stream by a XOR logical operator.

According to one embodiment, the bit stream for encryption of the scrambled data block is generated by applying a cryptographic function to a counter value which is incremented each time the data block is changed in an external memory.

According to one embodiment, the stream cipher encryption algorithm comprises a bit stream generation step performed simultaneously with the scrambling step.

According to one embodiment, the tag comprises a random reference value.

According to one embodiment, the reference value is securely stored in a memory.

According to one embodiment, the method comprises steps of forming a reference block comprising the reference value of at least one data block, and applying the encryption method to the reference block so as to obtain an encrypted reference block which is stored in an external memory.

Another embodiment of the present invention provides a method for decrypting an encrypted data block comprising steps of:

applying to the encrypted data block a stream cipher decryption algorithm providing a scrambled data block, and applying to the scrambled data block a reverse scrambling process, the reverse scrambling process providing a decrypted data block and corresponding to a scrambling process mixing the bits of an input data block so that any modification of the encrypted data block has a very high probability of being detected.

According to one embodiment, the method further comprises steps of:

extracting a tag from the decrypted data block, comparing at least a part of the tag with a reference value, and generating an error signal if the part of the tag is different from the reference value, the scrambling process being applied to the input data block concatenated with the tag, so that a modification of one bit in the encrypted data block impacts on the tag with a high enough probability.

According to one embodiment, the reverse scrambling process applies to the scrambled data block at least three iterations of a reverse Rijndael algorithm.

According to one embodiment, the stream cipher decryption algorithm combines each bit of the encrypted data block with a respective bit of a bit stream.

According to one embodiment, each bit of the encrypted data block is combined with a respective bit of the bit stream by a XOR logical operator.

According to one embodiment, the bit stream for decryption of the encrypted data block is generated by applying a cryptographic function to a counter value which is incremented each time the data block is changed in an external memory.

According to one embodiment, the tag comprises a random reference value.

According to one embodiment, the reference value is stored in a memory in a reference block comprising at least one reference value, said reference block being concatenated with a tag including a reference value and encrypted with said tag.

According to one embodiment, the method further comprises steps of:

reading in the memory an encrypted reference block including the reference value of the data block, and applying the decryption method to the read encrypted reference block to obtain the reference value of the data block.

Another embodiment of the present invention provides an integrated circuit comprising:

a processing unit, a memory controller linked to an external memory through a memory bus, for writing and reading data blocks in the external memory, a scrambling module providing from an input data block a scrambled data block, a reverse scrambling module for retrieving a data block from a scrambled data block, an encryption module for applying to the scrambled data block a stream cipher encryption algorithm providing an encrypted data block which is stored in the external memory, the scrambling module mixing the bits of the input data block so that any modification of the encrypted data block has a very high probability of being detected, and a decryption module for applying to an encrypted data block read in the external memory a stream cipher decryption algorithm providing a scrambled data block.

According to one embodiment, the integrated circuit further comprises:

a tag generator for generating a tag for an input data block to be encrypted, means for concatenating the tag with the input data block, the scrambling process being applied to the block resulting from concatenation to the scrambling process, so that a modification of one bit in the scrambled data block resulting from the scrambling process impacts on every bit of the input data block and the tag, means for extracting a tag from a decrypted data block provided by the reverse scrambling module, and a comparator for comparing at least a part of the tag with a reference value and for generating an error signal if the part of the tag is different from the reference value.

According to one embodiment, the scrambling process applies to the input data block at least three iterations of a Rijndael algorithm.

According to one embodiment, the stream cipher encryption algorithm combines each bit of a scrambled data block with a respective bit of a bit stream.

According to one embodiment, the encryption module comprises a XOR logical operator for combining each bit of the scrambled data block with a respective bit of the bit stream.

According to one embodiment, the stream cipher decryption algorithm combines each bit of an encrypted data block with a respective bit of a bit stream.

According to one embodiment, the decryption module comprises a XOR logical operator for combining each bit of the encrypted data block with a respective bit of the bit stream.

According to one embodiment, the integrated circuit further comprises a bit stream generator for generating a bit stream for encryption and decryption, the bit stream generator comprising a counter providing a counter value and a cryptographic function encrypting the counter value.

According to one embodiment, the bit stream generator generates a bit stream while a data block to be encrypted is processed by the scrambling module.

According to one embodiment, the tag comprises a random reference value.

According to one embodiment, the reference value is securely stored in a memory.

According to one embodiment, the integrated circuit further comprises means for forming a reference block comprising the reference value of at least one data block, means for encrypting the reference block so as to obtain an encrypted reference block which is stored in the external memory, and means for decrypting a reference block which is read in the external memory.

In one embodiment, a method for encrypting binary data blocks comprises the steps of applying to an input data block a reversible scrambling process, the scrambling process providing a scrambled data block; and applying to the scrambled data block a stream cipher encryption algorithm providing an encrypted data block, the scrambling process mixing bits of the input data block so that any modification of the encrypted data block has a probability of being detected after decryption. In one embodiment, the method further comprises steps of: generating a tag for the input data block to be encrypted; and concatenating the tag with the input data block, the scrambling process being applied to the block resulting from concatenation, so that a modification of one bit in the encrypted data block has a probability of impacting the tag when the encrypted data block is decrypted. In one embodiment, the scrambling process applies to the input data block at least three iterations of a Rijndael algorithm. In one embodiment, the stream cipher encryption algorithm combines each bit of the scrambled data block with a respective bit of a bit stream. In one embodiment, each bit of the scrambled data block is combined with a respective bit of the bit stream by a XOR logical operator. In one embodiment, the bit stream for encryption of the scrambled data block is generated by applying a cryptographic function to a counter value which is incremented each time the data block is changed in an external memory. In one embodiment, the stream cipher encryption algorithm comprises a bit stream generation step performed simultaneously with the scrambling step. In one embodiment, the tag comprises a random reference value. In one embodiment, the reference value is securely stored in a memory. In one embodiment, the method further comprises steps of forming a reference block comprising the reference value of at least one data block, and applying the encryption method to the reference block so as to obtain an encrypted reference block which is stored in an external memory. In one embodiment, the probability of detection of a modification of the encryption data block is at least a difference between unity and two raised to a negative power of a tag length.

In one embodiment, a method for decrypting an encrypted data block comprises steps of: applying to the encrypted data block a stream cipher decryption algorithm providing a scrambled data block; and applying to the scrambled data block a reverse scrambling process, the reverse scrambling process providing a decrypted data block and corresponding to a scrambling process mixing bits of an input data block so that any modification of the encrypted data block has a probability of being detected. In one embodiment, the method further comprises steps of: extracting a tag from the decrypted data block; comparing at least a part of the tag with a reference value; and generating an error signal if the part of the tag is different from the reference value, the scrambling process being applied to the input data block concatenated with the tag, so that a modification of one bit in the encrypted data block has a probability of impacting the tag when the encrypted data block is decrypted. In one embodiment, the reverse scrambling process applies to the scrambled data block at least three iterations of a reverse Rijndael algorithm. In one embodiment, the stream cipher decryption algorithm combines each bit of the encrypted data block with a respective bit of a bit stream. In one embodiment, each bit of the encrypted data block is combined with a respective bit of the bit stream by a XOR logical operator. In one embodiment, the bit stream for decryption of the encrypted data block is generated by applying a cryptographic function to a counter value which is incremented each time the data block is changed in an external memory. In one embodiment, the tag comprises a random reference value. In one embodiment, the reference value is stored in a memory in a reference block comprising at least one reference value, said reference block being concatenated with a tag including a reference value and encrypted with said tag. In one embodiment, the method further comprises steps of: reading in the memory an encrypted reference block including the reference value of the data block; and applying the decryption method to the read encrypted reference block to obtain the reference value of the data block. In one embodiment, the probability of detecting a modification of the encrypted data block is at least a difference between unity and two raised to a negative power of a tag length.

In one embodiment, an integrated circuit comprises: a processing unit; a memory controller linked to an external memory through a memory bus, for writing and reading data blocks in the external memory; a scrambling module providing from an input data block a scrambled data block; a reverse scrambling module for retrieving a data block from a scrambled data block; an encryption module for applying to the scrambled data block a stream cipher encryption algorithm providing an encrypted data block to be stored in the external memory, the scrambling module mixing the bits of the input data block so that any modification of the encrypted data block has a probability of being detected; and a decryption module for applying to an encrypted data block read in the external memory a stream cipher decryption algorithm providing a scrambled data block. In one embodiment, the integrated circuit further comprises: a tag generator for generating a tag for an input data block to be encrypted; means for concatenating the tag with the input data block, the scrambling module configured to scramble the block resulting from concatenation, so that a modification of one bit in the scrambled data block impacts on every bit of the input data block and the tag; means for extracting a tag from a decrypted data block provided by the reverse scrambling module; and a comparator for comparing at least a part of the tag with a reference value and for generating an error signal if the part of the tag is different from the reference value. In one embodiment, the scrambling module applies to the input data block at least three iterations of a Rijndael algorithm. In one embodiment, the encryption module is configured to combine each bit of a scrambled data block with a respective bit of a bit stream. In one embodiment, the encryption module comprises a XOR logical operator for combining each bit of the scrambled data block with a respective bit of the bit stream. In one embodiment, the decryption module is configured to combine each bit of an encrypted data block with a respective bit of a bit stream. In one embodiment, the decryption module comprises a XOR logical operator for combining each bit of the encrypted data block with a respective bit of the bit stream. In one embodiment, the integrated circuit further comprises a bit stream generator for generating a bit stream for encryption and decryption, the bit stream generator comprising a counter providing a counter value and a cryptographic function encrypting the counter value. In one embodiment, the bit stream generator is configured to generate a bit stream while a data block to be encrypted is processed by the scrambling module. In one embodiment, the tag comprises a random reference value. In one embodiment, the reference value is securely stored in a memory. In one embodiment, the integrated circuit further comprises means for forming a reference block comprising the reference value of at least one data block, means for encrypting the reference block so as to obtain an encrypted reference block which is stored in the external memory, and means for decrypting a reference block which is read in the external memory.

In one embodiment, an integrated circuit comprises: means for scrambling input data blocks; means for encrypting scrambled data blocks coupled to the means for scrambling input data blocks; and means for decrypting encrypted scrambled data blocks. In one embodiment, the integrated circuit further comprises: a processor configured to generate input data blocks; and a memory controller configured to store encrypted, scrambled data blocks in an external memory. In one embodiment, the integrated circuit further comprises: means for generating tags coupled to the means for scrambling input data blocks; and means for comparing coupled to the means for generating tags and the means for decrypting encrypted scrambled data blocks. In one embodiment, the integrated circuit further comprises: means for generating a binary stream coupled to the means for encrypting and the means for decrypting.

In one embodiment, a method of controlling data storage in an external memory comprises: scrambling a data block to produce a scrambled data block; encrypting the scrambled data block; and storing the encrypted data block in the external memory. In one embodiment, the method further comprises: adding a tag to an input data block to form the data block to be scrambled. In one embodiment, encrypting the scrambled data block comprises combining a bit stream with the scrambled data block. In one embodiment, the method further comprises: retrieving a stored encrypted data block from the external memory; decrypting the stored data block to produce a decrypted data block; and descrambling the decrypted data block. In one embodiment, descrambling the decrypted data block comprises separating a tag from a data portion of the decrypted data block. In one embodiment, the method further comprises comparing at least a portion of the tag to a reference value.

In one embodiment, an integrated circuit comprises: a processor configured to generate and process data packets; a memory controller configured to control transfers of data packets between the integrated circuit and an external memory; and a data protector coupled to the processor and the memory controller and configured to scramble and encrypt data packets received from the processor. In one embodiment, the data protector comprises: a tag generator configured to add tags to data packets received from the processor to produce tagged data packets; a scrambling module configured to scramble tagged data packets; and a random bit stream generator. In one embodiment, the data protector further comprises: a descrambling module configured to descramble data packets received from the memory controller; and a comparator.

In one embodiment, a computer-readable memory medium's contents cause an embedded computing device to perform a method, the method comprising: scrambling a data block by mixing bits in the data block; encrypting the scrambled data block using stream cipher encryption; and storing the encrypted data block in an external memory. In one embodiment, the method further comprises: adding a tag to a processor data block prior to scrambling to produce the data block. In one embodiment, the method further comprises: retrieving an encrypted data block from the external memory; and decrypting and unscrambling the retrieved data block. In one embodiment, the method further comprises: comparing a portion of the unscrambled data block to a reference; and selectively generating an error signal based on the comparison.

BRIEF DESCRIPTION OF THE SEVERAL VIEWS OF THE DRAWINGS

These and other advantages and features of the present invention will be presented in greater detail in the following description of the invention in relation to, but not limited by the appended drawings in which:

FIG. 3 represents in block form a processor connected to an external memory and equipped with a protection device according to an embodiment.

FIG. 4 represents in block form an exemplary stream cipher generator.

FIG. 5 represents in block form an exemplary tag generator.

FIG. 6 represents a tree structure for secure storage of reference values.

FIG. 7 represents steps of a process for verifying reference values stored according to the tree structure of FIG. 6 when a data block is read in a memory.

FIG. 8 represents steps of a process for updating the reference value tree of FIG. 6 when a data block is written in the memory.

DETAILED DESCRIPTION OF THE INVENTION

"A parallelized way to provide data encryption and integrity checking on a processor-memory bus", R. Elbaz, L. Torres, G. Sassatelli, P. Guillemin, M. Bardouillet and A. Martinez, in Proceedings of the 43rd Annual Conference on Design Automation (San Francisco, Calif., USA, Jul. 24-28, 2006), DAC'06, ACM Press, New York, N.Y., 506-509, discloses a system designed to protect the confidentiality and the authenticity of data transferred onto the processor-memory bus of a computing system. A first objective of parallel encryption and integrity checking (PE-ICE) is to perform encryption and integrity checking in a parallelized way and hence to parallelize latencies introduced by the underlying hardware mechanisms on read and write operations.

Figure 1:
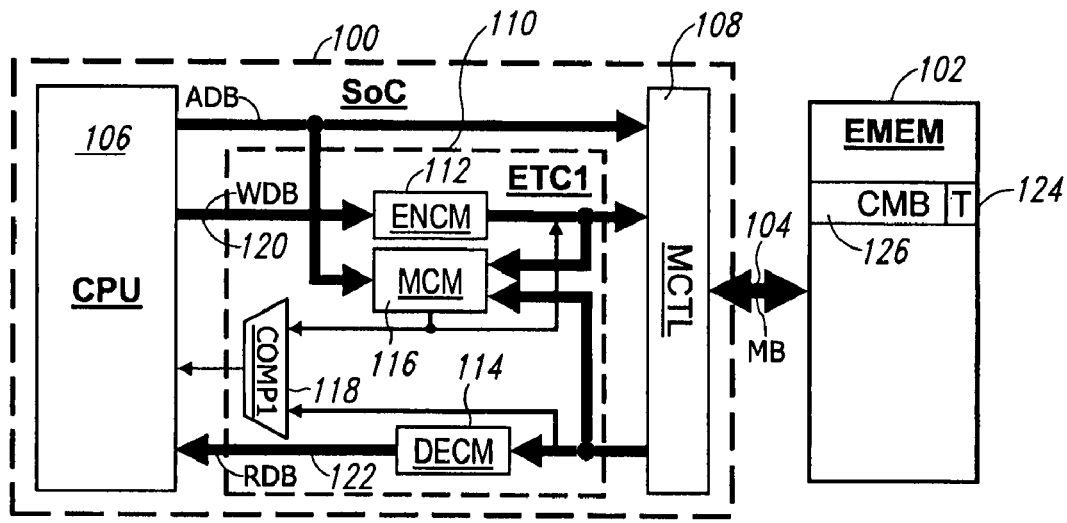
FIG. 1 described above represents in block form a processor connected to an external memory and equipped with a prior art protection device.
Figure 2:
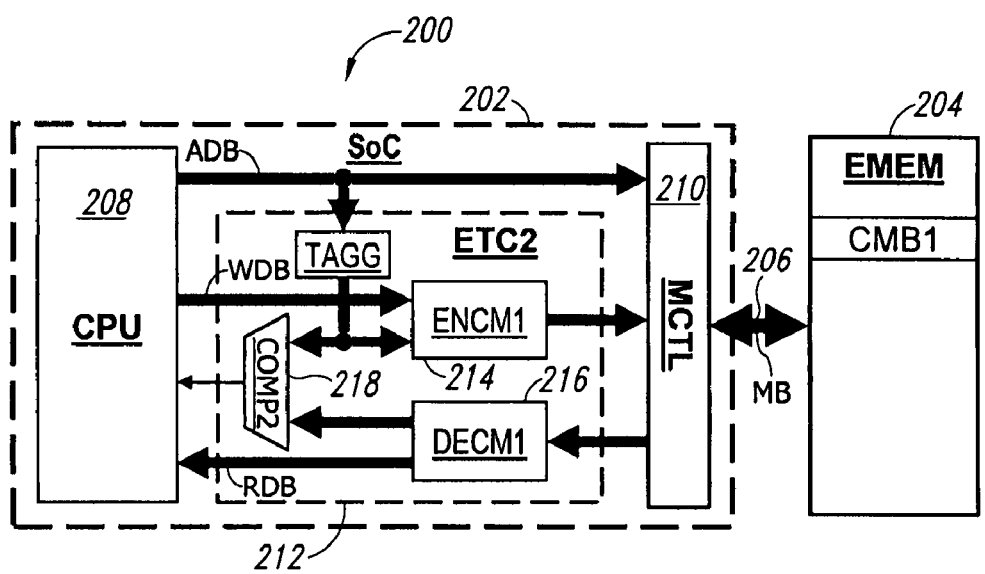
FIG. 2 represents in block form a processor connected to an external memory and equipped with a protection device according to an embodiment.

FIG. 2 illustrates in block form a system 200 for performing block encryption and providing confidentiality and authentication. The system 200 comprises an SoC 202 connected to an external memory EMEM 204 through a memory bus MB 206. The SoC 202 comprises a processing unit CPU 208, a memory controller MCTL 210 and a protection device ETC2 212 therebetween. In some embodiments, the SoC 202 may comprise one or more integrated circuits. The device ETC2 212 comprises an encryption module ENCM1 214, a decryption module DECM1 216 and a comparator COMP2 218.

During a write operation, a tag is combined with data to be written to form a data block which is encrypted by the module ENCM1, using a secret key K. The tag is for instance a counter value or a random value, possibly combined with a part of the address of the data block in the external memory. The encrypted block CMB1 thus obtained is written in the memory EMEM.

During a read operation, an encrypted block CMB1 is read in the memory EMEM and decrypted by the module DECM1 using the secret key K. The module DECM1 thus provides a decrypted data block and a tag which is compared with a reference tag by the comparator COMP2. The reference tag may be obtained in the same manner as when the block data was written in the external memory. If the tag matching process fails, an integrity checking flag provided by the comparator COMP2 informs the unit CPU which in turn adopts an adequate behavior.

The block encryption algorithm chosen may be such that the resulting position and value of each bit in the encrypted block vary as a function of all bits of the corresponding not encrypted or plaintext data block. In this manner it is impossible to distinguish the data block part from the tag part in the encrypted block CMB1. Moreover, if one bit is changed in the encrypted block, there is a strong probability that the resulting tag is impacted. In other words, the protection of the data is ensured if the encryption algorithm used has a bit scrambling property.

PE-ICE is therefore based on block encryption scheme waiting to receive a whole block before starting the encryption or decryption processes. It results that such a block encryption does not optimize latencies on read and write operations.

FIG. 3 represents a system 300 comprising an embedded system SoC 302 comprising a central processing unit CPU 304, a memory controller MCTL 306 for controlling access of the unit CPU 304 to an external memory EMEM 308. The controller MCTL 306 is connected to the memory EMEM 308 by a memory bus MB 310. The unit CPU 304 is connected to the controller MCTL 306 by an address bus ADB 312, a write data bus WDB 314 and a read data bus RDB 316. The embedded system 302 further comprises a protection device ETC 318 connected to the write and read data buses WDB 314 and RDB 316 between the unit CPU 304 and the controller MCTL 306. The device ETC 318 is further connected to the address bus ADB 312.

The device ETC 318 comprises a reversible scrambling module BSM 320, a reverse scrambling module RBSM 322, a random binary stream generator BSG 324, a tag generator TAGG 326, two logical operators X1 328 and X2 330 configured to perform a bitwise logical operation XOR (Exclusive OR) between two data blocks, and a comparator COMP 332. An input of the module BSM 320 is connected to the unit CPU 304 by the bus WDB 314 and to an output of the generator TAGG 326. An output of the module BSM 320 is connected to an input of the operator X1 328, an output of which is connected to the controller MCTL 306. An input of the module RBSM 322 is connected to an output of the operator X2 330, an input of which is connected to the controller MCTL 306. Two outputs of the module RBSM 322 are respectively connected to an input of the comparator COMP 332 and to the bus RDB 316 towards the unit CPU 304. The generator BSG 324 is connected to an input of each operator X1 328, X2 330. An output of the comparator COMP 332 is connected to the unit CPU 304.

During a write operation, the scrambling module BSM 320 applies to a data block to be written in the external memory EMEM 308 (on bus WDB 314), combined (concatenated) with a tag T provided by the generator TAGG 326, a scrambling function providing scrambling of the bits of the data block. During scrambling, the bits of the tag T are mixed with the data bits by the module BSM 320 in a resulting scrambled data block, so as to prevent unauthorized separating of the tag T and the data. In parallel, the generator BSG 320 generates a bit stream which is combined by the function X1 328 with the scrambled data block so as to obtain an encrypted data block which is transmitted to the controller MCTL 306 to be written in the external memory EMEM 308.

During a read operation, an encrypted data block is read in the memory EMEM 308 and transmitted to the function X2 330 where it is combined with a bit stream generated by the generator BSG 324 so as to obtain a scrambled data block in which the tag is mixed with the data of the data block. The bit stream used for decrypting the encrypted data block is the same as the one used for encrypting the data block. The generation of the bit stream can be performed when the encrypted block is read in the memory EMEM 308. The module RBSM 322 then applies to the scrambled data block a reverse scrambling function so as to provide the original data and the tag T concatenated therewith. The tag T thus obtained is then compared during a tag matching operation performed by the comparator COMP 332 with a reference tag provided by the generator TAGG 326. If the tag of the read data block does not match the reference tag, an error signal is provided to the unit CPU 304. Thus if an adversary tampers with or modifies one or more bits in the encrypted data block read, the corruption will impact on the tag with a high enough probability ($>1-2^{-t}$ where t is the tag length) thanks to the scrambling function implemented by the module BSM 320. Therefore such a corruption will be detected by the tag matching operation.

In contrast with PE-ICE solution (FIG. 2), decryption and integrity checking processes (tag comparison) are performed serially, but the decryption preprocessing (bit stream generation) performed by the generator BSG 324 in parallel with block data loading compensates these non-parallelized computations.

The scrambling function implemented by the module BSM 320 may be performed such that the probability of modifying the encrypted block in any way (for example by XORing it with a constant, but other modifications may also be envisaged) without modify the bits of the tag is small enough. Small enough in this context may mean, for example, a probability of $\frac{1}{2}^{t}$ where t is the length of the tag. The scrambling function can be realized by several iterations or rounds (instead of 10 for AES-128) of the AES (Advanced Encryption System) algorithm using as key a constant that may be public (for example a key with only zeroes). The number of iterations desired to sufficiently scramble the bits of the input data block depends on the data block size (number of bits of the data block) and the size of the tag. More generally, the scrambling function can be realized by three or more rounds of the Rijndael algorithm from which the AES algorithm is derived when the tag length is 8 bits or more. If the tag length is larger, at least 4 AES rounds should generally be taken: 4 rounds are generally sufficient but more rounds can be performed without lowering security. If Rijndael algorithm is used with a block length different greater than 128 bits, 5 rounds may be desired. In these examples, the module RBSM 322 may be realized by three iterations of the reverse AES algorithm (or reverse Rijndael algorithm). For more details, the Rijndael algorithm is described in "The Design of Rijndael, AES—The Advanced Encryption Standard", Joan Daemen, Vincent Rijmen, Springer-Verlag 2002, or "AES Proposal: Rijndael", Joan Daemen, Vincent Rijmen, March 1999, available at http://csrc.nist.gov/CryptoToolkit/aes/rijndael/Rijndael-ammended.pdf, and the AES algorithm is specified in "Advanced Encryption Standard (AES)", National Institute of Science and Technology (NIST), FIPS PUB 197, November 2001.

The generator BSG 324 combined with the operator X1 328 implements a stream cipher algorithm such as, for example, RC4 (Rivest Cipher 4) described at http://tools.ieff.org/html/draft-kaukonen-cipher-arcfour-01. The generator BSG 324 combined with the operator X2 330 implements a reverse decryption algorithm.

FIG. 4 represents an example embodiment of a bit stream generator BSG 400, that may be employed, for example, by the embodiment of FIG. 3. In FIG. 4, the generator BSG 400 comprises a counter CNT 402 and a block encryption module ENC 404. The counter CNT 402 is first loaded with an initial value IV. The value of the counter is provided to the encryption module ENC 404 which encrypts the counter value using a secret key K. The module ENC 404 provides each bit of the bit stream BS. For instance, the module ENC 404 may implement an AES encryption algorithm (with 10 rounds).

For security reasons, a same bit stream BS generated by the generator BSG 400 preferably should not be used twice for two different data blocks to be encrypted. To this purpose a global counter value is managed on-chip for the whole external memory, the counter value of the counter CNT 402 being incremented each time a data block is changed in the external memory. Each counter value used for encryption of a data block can be stored off-chip, for instance in the memory EMEM 308. These values do not need to be protected since they are only used for decryption and after being encrypted using the secret key K.

The composition of the tags generated by the tag generator TAGG 326 can vary depending on the kind of data block, read-only or rewritable in the external memory EMEM 308. Read-only data blocks may be written once and then not modified during execution of software by the unit CPU 304. These data blocks are thus only sensitive to spoofing and splicing attacks.

Accordingly the tag contained in each read-only data block can be fixed since the data block is stored in the memory EMEM 308 at a fixed address and is never modified. Moreover, it can be public because an adversary needs the secret encryption key to create an accepted data block and tag pair. However, the adversary should be prevented from choosing the reference tag or to influencing its generation. Hence, the tag generator TAGG 326 generates a tag comprising a part of the encrypted block address which is different for each encrypted data block stored in the memory EMEM 308 so a tag is used only once for the same data block. The part of the address used as a tag may depend on the size of the data block and the size of the memory to be protected. If the protected memory is too large, it can be divided into segments each being associated with a key added to the tag. Another solution consists in adding to the tag a random value which is different for each encrypted data block stored in the memory EMEM 308. If an attacker performs a splicing attack, the address used by the processing unit CPU 304 to fetch a block and by the generator TAGG 326 to generate the reference tag T' will not match the one loaded as tag T from the memory EMEM 308.

Data blocks that are modified during software execution (read-write data blocks) are sensitive to replay attacks. Using only the address as tag for a read-write data block may not be enough to prevent such an attack because the address bits will not relate changes between write operations at a given location in memory, and thus the protection device ETC 318 may not be able to verify that the data stored at a given address is the most recent one (in case of an attack by temporal permutation). For that reason the tag comprises a reference value RV which is changed on each write operation. In an embodiment, the reference value is a random value generated on-chip. In this way, the tag is unpredictable from an adversary point of view making this latter unable to know when two encrypted data blocks have the same tag. However, the reference value does not necessarily need to be unpredictable. Thus, the reference value can be a nonce value (number used once) like a counter value. Besides, a random value is not a nonce since a random generator can generate twice the same number. If a counter (or predictable nonces) is used to generate the reference values, the same counter value should not be used twice. This can be avoided by changing the encryption key and to re-encrypting the corresponding memory section once the counter reaches its limit. Otherwise an adversary would be able to predict when a replay attack will succeed by waiting that the counter generates a same value. However, re-encryption may be very expensive. Thus the size of the reference values should not be chosen too small.

During read operations, the device ETC 318 retrieves the correct reference values to generate the reference tag T' for the integrity checking operation using the comparator COMP 332. On the other hand, the set of reference values should be secret and tamper-proof from an adversary point of view. If not secret, the adversary can perform a replay attack when he notices that two memory blocks are authenticated with the same reference value. If not tamper-proof, the replay attack can be performed by replaying a former block with its reference value. In order to solve this issue the random values generated on write operations may be stored on-chip in a secure memory. Thus, the random values are trusted since the system SoC 302 is trusted. Such a tag also protects against splicing attacks. However, instead of making this attack impossible, as it is the case for read-only data with the use of the address in the tag, the security relies as for replay on the difficulty for an adversary to find two data blocks associated with the same reference value. The probability to overcome this difficulty is the same as for replay attacks.

The size of a reference value fixes a trade-off between the strength of the countermeasure against replay and the on-chip memory overhead (size of the on-chip memory necessary to store the reference values of all the read-write data blocks). To reduce the on-chip memory overhead, without reducing the strength of the countermeasure, the tag T of each read-write data block is generated by concatenating a small random reference value RV with the most significant bits ADD of the address of the data block in the off-chip memory EMEM 308 (T=RV//ADD). Such a configuration decreases the strength against replay but maintains a countermeasure against splicing and reduces the on-chip memory cost.

FIG. 5 represents an embodiment of a tag generator TAGG 500 that may be employed, for example, in the embodiment of FIG. 3. In FIG. 5, the generator TAGG 500 comprises a random value generator RVG 502 and an internal or on-chip secured memory IMEM 504 for storing the random values generated. The random values of each tag generated are stored in the memory IMEM 504 as a function of the address in the external memory EMEM 308 of the data block for which the tag is generated. The random values in the memory IMEM 504 are stored as reference values to be used when the corresponding data block tag has to be verified during reading of the corresponding data block in the memory EMEM 308. The tag T generated for a data block is equal to the random value generated. The generator TAGG 500 comprises an optional function generator MF 508 combining the random value generated by the generator RVG 502 with the address of the data block for which the tag is to be generated, the result value of function MF 508 being the tag which is associated with the data block. For instance, the function MF concatenates a part of the address of the data block with the random value generated by the generator RVG 502.

However, the solution of storing in an on-chip memory all reference values to be used to verify the tags associated with the data blocks stored in the external memory EMEM has a not negligible cost in terms of on-chip memory consumption. This is the case when a high number of read-write data block stored in the external memory are to be protected against replay attacks.

According to an embodiment of the invention, all the reference values are stored not in an on-chip memory but in an external memory, such as the memory EMEM 308. These reference values preferably will be stored in the external memory while ensuring their confidentiality and their integrity as mentioned above. To this purpose, the reference values may be stored in the external memory according to a tree scheme 600 as depicted in FIG. 6. In FIG. 6, M1, M2, . . . , M16 represents encrypted data blocks stored in a memory, such as the memory EMEM 308. Each of these data blocks has a reference value RV01-RV016. The reference values RV01-RV016 of the data blocks M1-M16 are grouped into blocks R01-R04 of 2^n (2 raised at power n) reference values (n=2 in the example of FIG. 6) having the same size as the data blocks M1-M16. The blocks R01-R04 are securely stored in the memory EMEM 308 using reference values RV11-RV14. The reference values RV11-RV14 are in turn stored in the memory EMEM 308 in the form of a block R11 of 2^n reference values using a reference value RV20. This process is repeated for several tree levels i until the level comprises a single block of 2^n reference values (R11 in the example of FIG. 6) which is securely stored in the memory EMEM 308 using a reference value RV20. The last reference value RV20 is stored in the internal memory IMEM 504. Before being stored in the memory EMEM 308, each block Rik of reference values RVij//RVi(j+1) is concatenated with a tag calculated from a corresponding reference value RV(i+1)j' and then encrypted by the module BSM 320 and the operator X1 328 as the data blocks M1-M16.

For instance, each data block and reference block has a length of 160 bits including a payload of 128 bits and a tag of 32 bits. Each reference block comprises four references values of 32 bits.

FIG. 7 represents steps S1 to S6 of a process 700 performed when a data block Mj is read in the memory EMEM. At step S1, the data block Mj is read in the memory EMEM and decrypted. At step S2, the block R0k containing the reference value RV0j of the data block Mj read is retrieved in the memory EMEM 308 and decrypted (by X2 330 and RBSM 322). At step S3, the reference value RV'0j is extracted from the tag T of the block Mj and compared (by the comparator COMP 332) with the corresponding reference value RV0j contained in the block R0k. If the reference values are not the same, an error signal ERR is generated (step S5) and the process of reading a data block ends with an error. Else a new iteration is performed from step S2 if the current tree level i is different from the maximum number imax of tree levels at step S4 (imax=1 in the example of FIG. 6).

At each next iteration, a block Rik containing the reference value RVij of the block R(i−1)k' to be verified is read in the memory EMEM 308 and decrypted (step S2). At step S3, the reference value RV'ij is extracted from the tag T of the block R(i−1)k' and compared with the corresponding reference value RVij contained in the block Rik. If the reference values are not the same, an error signal ERR is generated (step S5) and the process of reading a data block ends with an error. Else a new iteration is performed from step S2 until the root RV20 of the tree. At the last iteration (step S6), the reference value RV'20 extracted from the tag T of the block R11 is compared with the corresponding reference value RV20 stored in the memory IMEM 504.

FIG. 8 represents steps S11 to S18 of a process 800 performed when a data block Mj is written in the memory EMEM. At step S11, a reference value RV0j is generated for the data block Mj. At step S12, a tag T is generated from the reference value RV0j and concatenated with the block Mj. The resulting block is encrypted (by BSM 320 and X1 328) and stored in the memory EMEM 308. At step S13, a block R0k where the reference value RV0j of the block Mj is to be memorized is read in the memory EMEM 308 and decrypted (by X2 330 and RBSM 322). At step S14, the reference value RV0j is inserted into the block R0k. At step S15, a reference value RV1j' is generated for the data block R0k. At step S16, if the current tree level i is different from the maximum number imax of tree levels, the reference value RV1j' is used to generate a tag for the block R0k, and this block is encrypted (by BSM 320 and X1 328) and stored in the memory EMEM 308. A new iteration is then performed from step S13.

At each next iteration, a block Rik containing a reference value RVij of a block R(i−1)k' is to be memorized is read in the memory EMEM 308 and decrypted (step S13). At step S14, the reference value RVij is inserted into the block Rik. At step S15, a reference value RV(i+1)j' is generated for the data block Rik. At step S16, if the current tree level i is different from the maximum number imax of tree levels, the reference value RV(i+1)j' is used to generate a tag for the block Rik, and this block is encrypted and stored in the memory EMEM 308. If at step S16 the current tree level i is equal to the maximum number of tree levels, the reference value generated at step S15 is an updated value of RV20 which is stored in the memory IMEM 504 (step S18).

It should be noted that since the reference values do not depend on the content of the data blocks, all operations of encrypting and decrypting blocks and generating reference values can be parallelized, provided that the circuits performing these operations are duplicated.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

In particular, the invention is not limited neither to a particular method of generating a tag, nor to a particular reversible scrambling process, nor to a particular method of generating a bit stream.

In addition, the cryptographic process combining the scrambled data block with the bit stream is not limited to a bitwise XOR operation.

Moreover, if the integrity of the data is not to be protected, the use of tags inserted in the data blocks is not necessary. Therefore, the comparator COMP is not necessary.

The invention can have other applications than integrated circuits. The invention can be applied to any data storage linked to a processing unit through a wired or wireless communication channel.

All of the U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for encrypting binary data blocks, comprising using at least one processing device to:
concatenate an input data block with a tag generating a tagged data block;
apply to the tagged data block a reversible scrambling process, the scrambling process providing a scrambled data block; and apply to the scrambled data block a stream cipher encryption algorithm providing an encrypted data block, the scrambling process mixing bits of the tagged data block so that any modification of the encrypted data block has a probability of being detected after decryption at least equal to a difference between unity and two raised to a negative power of a tag length.

2. The method according to claim 1, further comprising steps of:
generating a tag to be concatenated with the input data block to be encrypted, wherein the scrambling process applied to the tagged data block is performed so that a modification of one bit in the encrypted data block has a probability of impacting the tag when the encrypted data block is decrypted at least equal to a difference between unity and two raised to a negative power of the tag length.

3. The method according to claim 1 wherein the scrambling process applies to the tagged data block at least three iterations of a Rijndael algorithm.

4. The method according to claim 1 wherein the stream cipher encryption algorithm combines each bit of the scrambled data block with a respective bit of a bit stream.

5. The method according to claim 4 wherein each bit of the scrambled data block is combined with a respective bit of the bit stream by a XOR logical operator.

6. The method according to claim 4 wherein the bit stream for encryption of the scrambled data block is generated by applying a cryptographic function to a counter value which is incremented each time the data block is changed in an external memory.

7. The method according to claim 1 wherein the stream cipher encryption algorithm comprises a bit stream generation step performed simultaneously with the scrambling step.

8. The method according to claim 1 wherein the tag comprises a random reference value.

9. The method according to claim 8 wherein the reference value is securely stored in a memory.

10. The method according to claim 9, further comprising steps of forming a reference block comprising the reference value of at least one data block, and applying the encryption method to the reference block so as to obtain an encrypted reference block which is stored in an external memory.

11. A method for decrypting an encrypted data block, comprising using at least one processing device to perform steps of:
applying to the encrypted data block a stream cipher decryption algorithm providing a scrambled data block; and
applying to the scrambled data block a reverse scrambling process, the reverse scrambling process providing a decrypted data block concatenated with a tag and corresponding to a scrambling process mixing bits of an input data block concatenated with the tag so that any modification of the encrypted data block has a probability of being detected at least equal to a difference between unity and two raised to a negative power of a tag length.

12. The method according to claim 11, further comprising steps of:
extracting the tag from the decrypted data block;
comparing at least a part of the tag with a reference value; and
generating an error signal if the part of the tag is different from the reference value, the scrambling process being applied to the input data block concatenated with the tag, so that a modification of one bit in the encrypted data block has a probability of impacting the tag when the encrypted data block is decrypted at least equal to a difference between unity and two raised to a negative power of the tag length.

13. The method according to claim 11 wherein the reverse scrambling process applies to the scrambled data block at least three iterations of a reverse Rijndael algorithm.

14. The method according to claim 11 wherein the stream cipher decryption algorithm combines each bit of the encrypted data block with a respective bit of a bit stream.

15. The method according to claim 14 wherein each bit of the encrypted data block is combined with a respective bit of the bit stream by a XOR logical operator.

16. The method according to claim 14 wherein the bit stream for decryption of the encrypted data block is generated by applying a cryptographic function to a counter value which is incremented each time the data block is changed in an external memory.

17. The method according to claim 11 wherein the tag comprises a random reference value.

18. The method according to claim 17 wherein the reference value is stored in a memory in a reference block comprising at least one reference value, said reference block being concatenated with a tag including a reference value and encrypted with said tag.

19. The method according to claim 18, further comprising steps of:
reading in the memory an encrypted reference block including the reference value of the data block; and
applying the decryption method to the read encrypted reference block to obtain the reference value of the data block.

20. An integrated circuit, comprising:
a processing unit;
a memory controller linked to an external memory through a memory bus, and configured to write and read data blocks in the external memory;
a scrambling module configured to generate from a tagged data block a scrambled data block;
a reverse scrambling module configured to retrieve a tagged data block from a scrambled data block;
an encryption module configured to apply to the scrambled data block a stream cipher encryption algorithm providing an encrypted data block to be stored in the external memory, the scrambling module mixing the bits of the tagged data block so that any modification of the encrypted data block has a probability of being detected at least equal to a difference between unity and two raised to a negative power of a tag length; and
a decryption module configured to apply to an encrypted data block read in the external memory a stream cipher decryption algorithm providing a scrambled data block.

21. The integrated circuit according to claim 20, further comprising:
a tag generator configured to generate a tag for an input data block to be encrypted;
means for concatenating the tag with the input data block, the scrambling module configured to scramble the block resulting from concatenation, so that a modification of one bit in the scrambled data block has a probability of impacting on every bit of the input data block and the tag at least equal to a difference between unity and two raised to a negative power of the tag length;
means for extracting a tag from a decrypted data block provided by the reverse scrambling module; and
a comparator configured to compare at least a part of the tag with a reference value and for generating an error signal if the part of the tag is different from the reference value.

22. The integrated circuit according to claim 20 wherein the scrambling module applies to the tagged data block at least three iterations of a Rijndael algorithm.

23. The integrated circuit according to claim 20 wherein the encryption module is configured to combine each bit of a scrambled data block with a respective bit of a bit stream.

24. The integrated circuit according to claim 23 wherein the encryption module comprises a XOR logical operator for combining each bit of the scrambled data block with a respective bit of the bit stream.

25. The integrated circuit according to claim 20 wherein the decryption module is configured to combine each bit of an encrypted data block with a respective bit of a bit stream.

26. The integrated circuit according to claim 25 wherein the decryption module comprises a XOR logical operator for combining each bit of the encrypted data block with a respective bit of the bit stream.

27. The integrated circuit according to claim 20, further comprising a bit stream generator for generating a bit stream for encryption and decryption, the bit stream generator comprising a counter providing a counter value and a cryptographic function encrypting the counter value.

28. The integrated circuit according to claim 27 wherein the bit stream generator is configured to generate a bit stream while a data block to be encrypted is processed by the scrambling module.

29. The integrated circuit according to claim 21 wherein the tag comprises a random reference value.

30. The integrated circuit according to claim 29 wherein the reference value is securely stored in a memory.

31. The integrated circuit according to claim 29, further comprising means for forming a reference block comprising the reference value of at least one data block, means for encrypting the reference block so as to obtain an encrypted reference block which is stored in the external memory, and means for decrypting a reference block which is read in the external memory.

32. An integrated circuit, comprising:
   means for concatenating input data blocks to be encrypted with tags, generating tagged data blocks;
   means for scrambling tagged data blocks, the means for scrambling being coupled to the means for concatenating;
   means for encrypting scrambled data blocks coupled to the means for scrambling, the means for scrambling being configured to mix the bits of the tagged data blocks so that any modification of an encrypted data block has a probability of being detected at least equal to a difference between unity and two raised to a negative power of a tag length; and
   means for decrypting encrypted scrambled data blocks.

33. The integrated circuit of claim 32, further comprising:
   a processor configured to generate input data blocks; and
   a memory controller configured to store encrypted, scrambled data blocks in an external memory.

34. The integrated circuit of claim 32, further comprising:
   means for generating tags coupled to the means for scrambling tagged data blocks; and
   means for comparing coupled to the means for generating tags and the means for decrypting encrypted scrambled data blocks.

35. The integrated circuit of claim 32, further comprising: means for generating a binary stream coupled to the means for encrypting and the means for decrypting.

36. A method of controlling data storage in an external memory, comprising:
   under control of at least one processing device,
      adding a tag to an input data block to produce a tagged data block;
      scrambling the tagged data block to produce a scrambled data block;
      encrypting the scrambled data block, the tagged data block being scrambled so that any modification of the encrypted data block has a probability of detection at least equal to a difference between unity and two raised to a negative power of a tag length; and
      storing the encrypted data block in the external memory.

37. The method of claim 36 wherein encrypting the scrambled data block comprises combining a bit stream with the scrambled data block.

38. The method of claim 36, further comprising:
   retrieving a stored encrypted data block from the external memory;
   decrypting the stored data block to produce a decrypted data block; and
   descrambling the decrypted data block.

39. The method of claim 38 wherein descrambling the decrypted data block comprises separating a tag from a data portion of the decrypted data block.

40. The method of claim 39, further comprising comparing at least a portion of the tag to a reference value.

41. An integrated circuit, comprising:
   a processor configured to generate and process data packets;
   a memory controller configured to control transfers of data packets between the integrated circuit and an external memory; and
   a data protector coupled to the processor and the memory controller and configured to:
      add tags to data packets received from the processor to produce tagged data packets;
      apply to tagged data packets a reversible scrambling process, the scrambling process providing scrambled data packets; and
      encrypt scrambled data packets providing encrypted data packets, the scrambling process mixing bits of a tagged data packet so that any modification of an encrypted data packet has a probability of being detected at least equal to a difference between unity and two raised to a negative power of a tag length.

42. The integrated circuit of claim 41 wherein the data protector comprises:
   a scrambling module configured to scramble tagged data packets; and
   a random bit stream generator.

43. The integrated circuit of claim 42 wherein the data protector further comprises:
   a descrambling module configured to descramble data packets received from the memory controller; and
   a comparator.

44. A non-transitory computer-readable memory medium whose contents cause an embedded computing device to perform a method, the method comprising:
   adding a tag to an input data block to produce a tagged data block;
   scrambling the tagged data block by mixing bits in the tagged data block;
   encrypting the scrambled data block using stream cipher encryption, the tagged data block being scrambled so that any modification of an encrypted data block has a probability of being detected after decryption at least equal to a difference between unity and two raised to a negative power of a tag length; and storing the encrypted data block in an external memory.

45. The non-transitory computer-readable memory medium of claim 44 wherein the method further comprises:

retrieving an encrypted data block from the external memory; and decrypting and unscrambling the retrieved data block.

46. The non-transitory computer-readable memory medium of claim 45 wherein the method further comprises:

comparing a portion of the unscrambled data block to a reference; and selectively generating an error signal based on the comparison.

* * * * *

UNITED STATES PATENT AND TRADEMARK OFFICE
CERTIFICATE OF CORRECTION

PATENT NO.        : 8,000,467 B2
APPLICATION NO.   : 11/725985
DATED             : August 16, 2011
INVENTOR(S)       : Reouven Elbaz et al.

It is certified that error appears in the above-identified patent and that said Letters Patent is hereby corrected as shown below:

On the Title Page:

Item 73
"STMicroelectronics SA, Montrouge (FR); Ecole Nationale Superieure des Mines de Saint-Etienne, Saint-Etienne Cedex (FR); STMicroelectronics S.r.l., Agrate Brianza (IT); Porton World International N.V., Zaventem (BE)" should read, --STMicroelectronics SA, Montrouge (FR); Ecole Nationale Superieure des Mines de Saint-Etienne, Saint-Etienne Cedex 2 (FR); STMicroelectronics S.r.l., Agrate Brianza (IT); Proton World International N.V., Zaventem (BE)--.

Item 56
"Kaukonen, K. et al. A Stream Cipher Encryption Algorithm "Arcfour," <draft-kaukonen-cipher-arcfour-01.txt>, Jul. 1997, 13 pages." should read, --Kaukonen, K. et al. "A Stream Cipher Encryption Algorithm "Arcfour," <draft-kaukonen-cipher-arcfour-01.txt>, Jul. 1997, 13 pages.--.

Signed and Sealed this
Thirty-first Day of July, 2012

David J. Kappos
*Director of the United States Patent and Trademark Office*